United States Patent [19]

Feldman et al.

[11] 4,162,124

[45] Jul. 24, 1979

[54] PASSIVE OPTICAL RANGEFINDER-SEXTANT

[75] Inventors: Sidney Feldman, Silver Spring, Md.; George G. Barton, Jr., Harkers Island, N.C.

[73] Assignee: The United States of America as represented by the Secretary of the Navy, Washington, D.C.

[21] Appl. No.: 882,285

[22] Filed: Feb. 28, 1978

[51] Int. Cl.² .................... G01C 3/08; G01B 11/26; G01C 1/00
[52] U.S. Cl. .......................................... 356/4; 356/1; 356/141; 356/144; 356/146; 356/255; 358/103
[58] Field of Search ................ 356/1, 4, 141, 152, 356/144, 255, 146; 358/103, 107

[56] References Cited

U.S. PATENT DOCUMENTS

| | | | |
|---|---|---|---|
| 3,498,717 | 3/1970 | Kumagai | 356/5 |
| 3,796,492 | 3/1974 | Cullen et al. | 356/4 |
| 3,889,052 | 6/1975 | Back | 358/103 |
| 3,985,446 | 10/1976 | Feldman et al. | 356/144 |
| 4,009,960 | 3/1977 | Feldman et al. | 356/1 |

Primary Examiner—S. C. Buczinski
Attorney, Agent, or Firm—R. S. Sciascia; A. L. Branning; R. E. Bushnell

[57] ABSTRACT

A passive opto-electric rangefinder with remotely controllable index mirrors independently rotatable about normal axes, each axis perpendicular to the line-of-sight.

8 Claims, 12 Drawing Figures

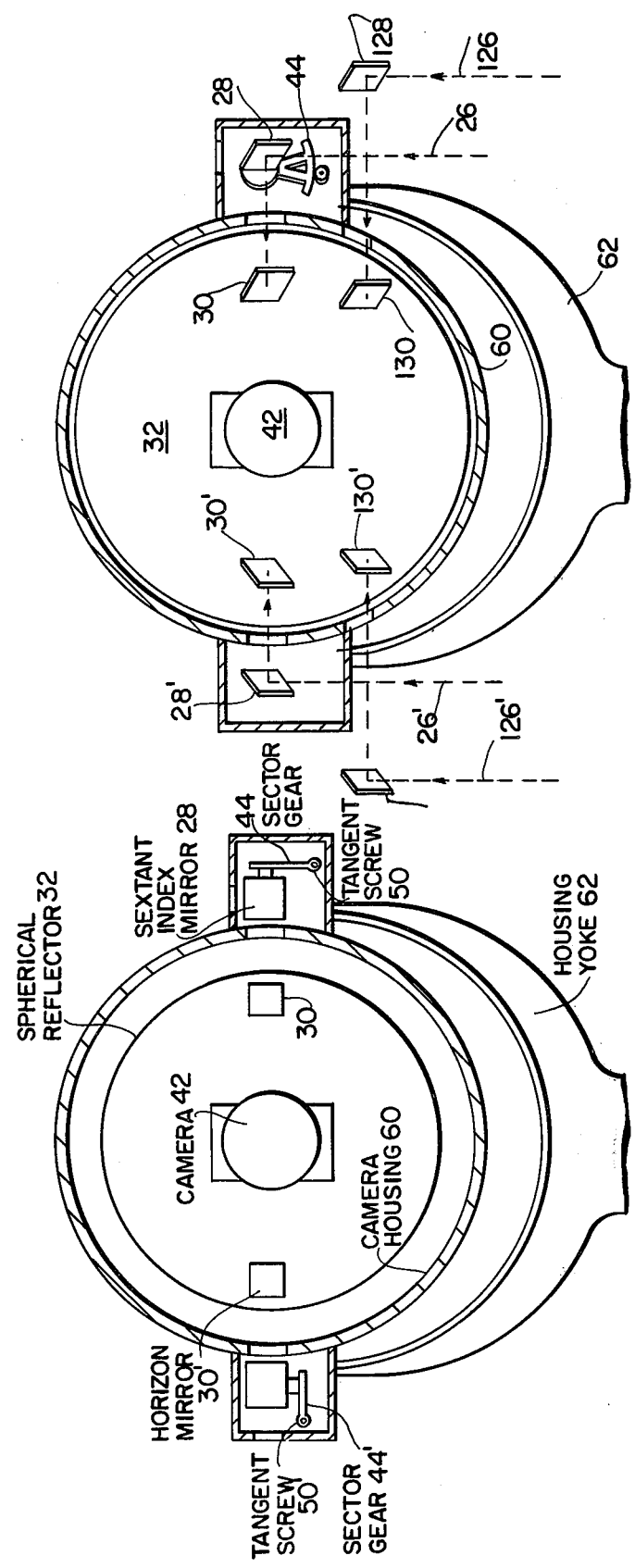

PASSIVE OPTICAL RANGEFINDER-SEXTANT

BACKGROUND OF THE INVENTION

The present invention relates generally to navigational devices and more particularly to sextants and rangefinders.

The dominant method of determining position at sea is celestial navigation using a hand held marine sextant to obtain the altitutude of stars and other celestial bodies. The sextant has limitations. It requires sufficient daylight illumination and weather clarity to simultaneously see the celestial bodies and the horizon. Rolling, pitching and yawing caused by heavy weather make operation of a hand held sextant difficult.

SUMMARY OF THE INVENTION

Our U.S. Pat. No. 3,985,446 discloses a remotely controllable sextant using an integral bi-directional gauge to provide a signal indicative of the altitude of a sighted celestial object. Our U.S. Pat. No. 4,009,960 discloses a passive optical rangefinger in which a visual display is scanned to provide a signal indicative of the range of a sighted distant object. The present invention is an improvement upon those disclosed in our last two United States Patents, in which a remotely controllable, optical navigation instrument using rotatable index and stationary horizon mirrors, in pairs asymmetrically disposed about a vertical plane bisecting the longitudinal axis (i.e., the line-of-sight) of a stabilized horizontal camera. The axes of rotation of the index mirrors are mutually normal and perpendicular to the longitudinal axis. When fixed at infinity, the index mirrors convey a double image of distant objects via their respective horizon mirrors to a spherical reflector and onto the camera. Ancillary electronic circuitry selectively filters and scans the double image to determine the range of the object. Independently, the index mirror rotatable about a horizontal axis serves to measure altitude, while the index mirror rotatable about a vertical axis serves to measure horizontal angles.

Accordingly, it is an object of the present invention to provide an improved optical rangefinder.

It is another object to provide a passive optical instrument equally serviceable for measurement of range and elevation.

It is yet another object to provide a passive optical instrument equally serviceable for measurement of range and bearing.

It is still another object to provide a passive optical rangefinder equally serviceable for measurement of altitude and horizontal angle.

It is still yet another object to provide a remotely controllable, passive optical rangefinder equally serviceable for measurement of altitude and horizontal angle.

It is a further object to provide a remotely controllable, passive optical rangefinder equally serviceable for simultaneous measurement of angles of altitude and bearing.

It is a still further object to provide a remotely controllable, passive optical instrument equally serviceable for simultaneous measurement of range and angles of altitude and bearing.

BRIEF DESCRIPTION OF THE DRAWINGS

A more complete appreciation of this invention, and many of the attendant advantages thereof, will be readily enjoyed as the same becomes better understood by reference to the following detailed description when considered in conjunction with the accompanying drawings in which like numbers indicate the same or similar components, wherein:

FIG. 11 is a front view of another alternate embodiment of the invention.

FIG. 12 is a front view of still another alternate embodiment of the invention.

DETAILED DESCRIPTION OF THE EMBODIMENTS

Figure 1:
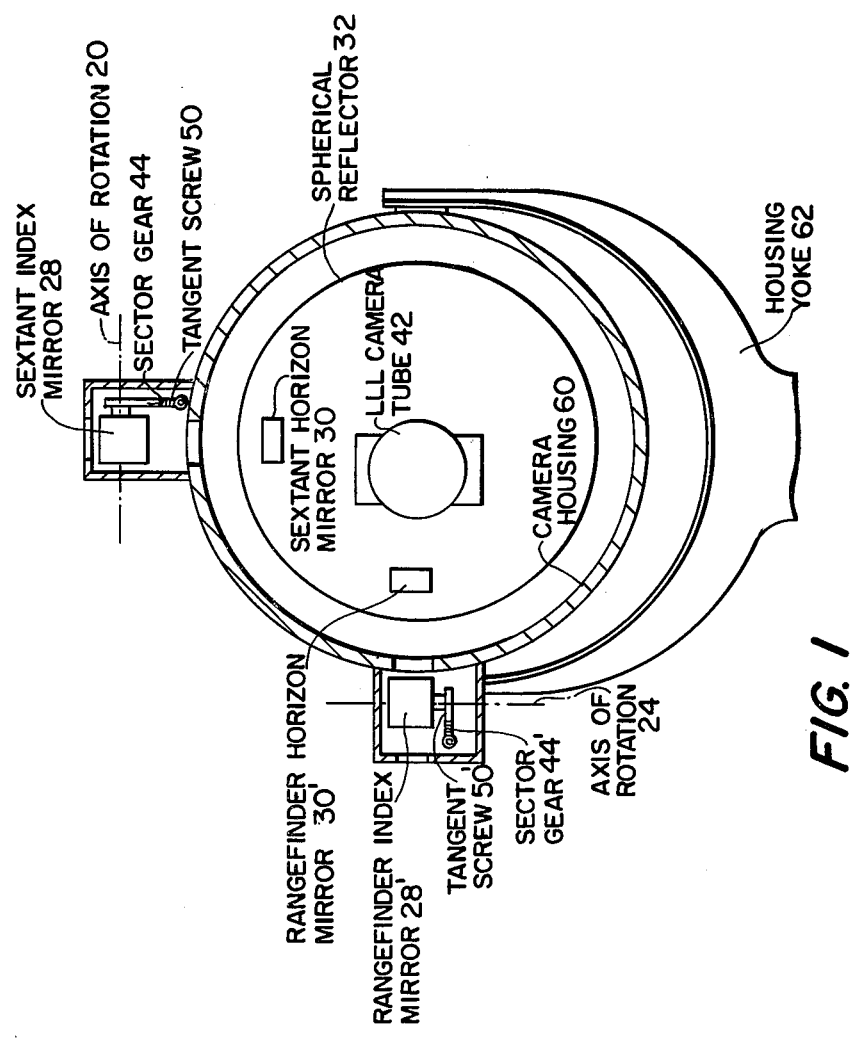
FIG. 1 shows a front view of a rangefinder equipped to perform altitude and bearing measurements.

A front view of one embodiment of a remotely controllable rangefinder capable of providing altitude and bearing measurement, is shown in FIG. 1 of the drawings. A sextant index mirror 28 is rotatably mounted above a sextant horizon mirror 30. Another index mirror 28' is rotatably mounted alongside a second horizon mirror 30'. Both horizon mirrors 30, 30', are fixed at oblique angles to the plane of FIG. 1 in order to reflect images from index mirrors 28, 28' respectively, and onto a concave spherical reflector 32 that is mounted towards the rear of camera housing tube 60. A low-light-level camera tube 42 is mounted with the longitudinal axis of its field-of-view parallel to but off center from, the principal axis of spherical reflector 32. As is shown by the horizontal plane diagram of FIG. 2, camera 42 is located just outside the principal focus of spherical reflector 32. The axes of rotation 20, 24 of index mirrors 28, 28' are mutually normal, each axis lying in the plane of FIG. 1 and being perpendicular to the principal axis of the concave spherical reflector 32. The entire assembly is disposed within or about camera housing tube 60, which is pivotably held in a yoke 62.

Figure 2:
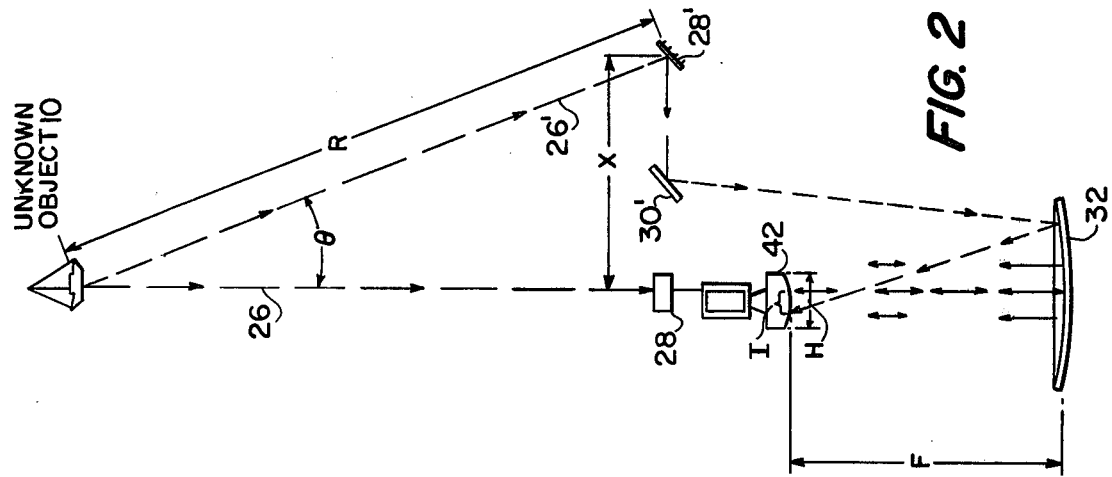
FIG. 2 is a schematic showing the ray traces in the ran gefinder of a distant object in a horizontal plane.

FIG. 2 sets forth in a horizontal plane the optical portion of the device shown in FIG. 1, tracing on an exaggerated scale the image rays of an unknown object 10 located a distant R from the rangefinder. The image of object 10 is reflected from the surfaces of index mirrors 28, 28', onto horizon mirrors 30 (n.b., hidden beneath index mirror 28), 30', then onto spherical reflector 32, and ultimately onto LLLTV camera 42. When the device is operated in a rangefinding mode index mirrors 28, 28', each rotatable about an axis located a known distance, X, from the principal axis of reflector 32, are fixed at an infinite range. The rays between object 10 and index mirrors 28, 28′ form an angle $\theta$ with the principal axis. The image displacement at the photosurface of camera 42 is indicated by the dimension I, while the width of the photosurface is indicated by the dimension H. From a purely geometrical analysis:

$$2\theta \text{ (radians)} = \frac{X}{R} \text{ when } R \; X. \tag{1}$$

From the optics shown in FIG. 2;

$$2\theta \text{ (radians)} = \frac{I}{f} \tag{2}$$

where f=the effective focal length of the objective lens. Thus, $$\frac{X}{R} = \frac{I}{f} \tag{3}$$

and, $$R = \frac{Xf}{I}. \tag{4}$$

Since Xf is fixed for the device, its value can be considered to be a constant; and as the photosurface of camera 42 is located outside the focal point of reflector 32, the range R is inversely proportional to the image displacement, that is, to the distance between dual images of the object, on the photosurface. The image displacement, I, can be calculated by the time required for LLLTV camera 42 to scan the distance I. By proportions, if it takes fifty microseconds to scan the distance H, then:

$$\frac{I \text{ (dist.)}}{H \text{ (dist.)}} = \frac{T \text{ (time to scan } I)}{50 \text{ sec.}} \tag{5}$$

and, $$I = \frac{HT}{50 \text{sec.}}. \tag{6}$$

Inserting equation (6) into equation (4), $$R = \frac{Xf}{HT} 50 \text{ sec.} \tag{7}$$

Thus, by knowing T (the time required to scan distance I), the range R can be found since X, f, and H are fixed for the device.

Figure 3:
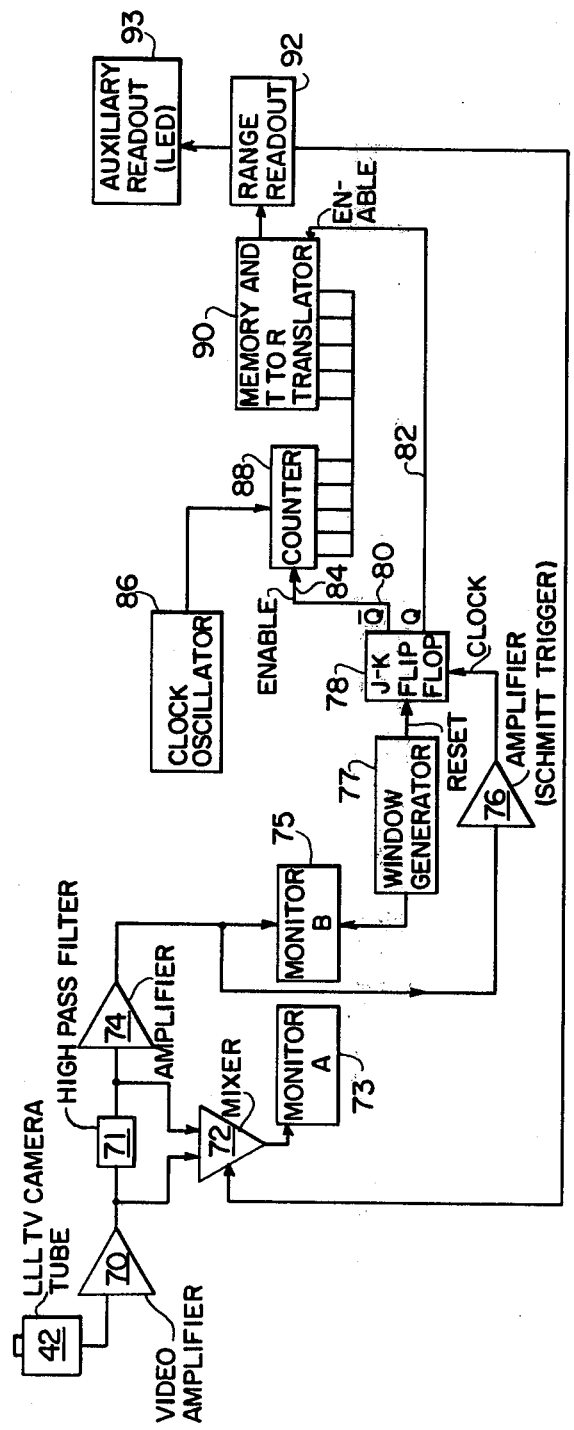
FIG. 3 is a single line block diagram of the electronic time scanner used when the embodiment of FIG. 1 is operated in a rangefinding mode.

FIG. 3 shows a single line block diagram of the electronic portion of the device -the network for determining the value of T and therefore, the range R. The dual image of object 10 formed by the reflective surfaces 28, 28′ are, upon detection by LLLTV camera 42, converted into a representative video signal. As is described our U.S. Pat. No. 4,009,960, that signal is amplified by video amplifier 70 and is passed through high pass filter 71. Both the filtered and unfiltered video signals are combined in mixer 72 to enhance the resolution of the display appearing on monitor A, 73. The filtered signal controls amplifier 74, which provides the signal controlling the display of monitor B, 75.

Figure 4:
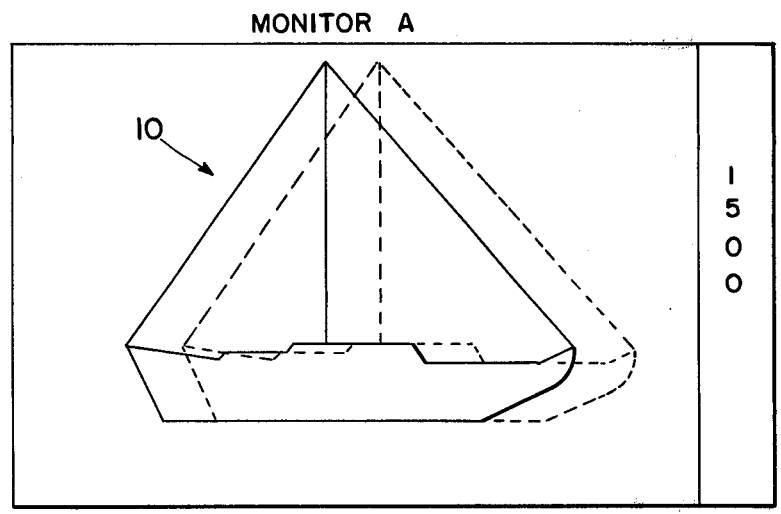
FIG. 4 illustrates a typical scene produced by monitor A of FIG. 3.
Figure 5:
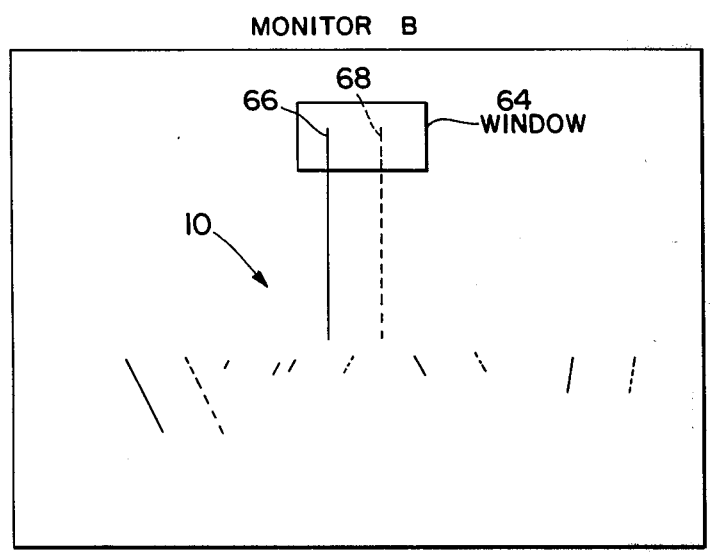
FIG. 5 illustrates a typical scene produced by monitor B of FIG. 3.

FIGS. 4 and 5 show typical displays of monitors A and B, 73, 75 respectively. The unknown object 10 appears on monitor A as the dual image shown in FIG. 4, one image represented by a solid outline and the other image by a dashed line. The value of the range is displayed in digital form at the right side of monitor A. Monitor B, as shown in FIG. 5, displays only the signal from high pass filter 74 so that only the vertical sections 66, 68 of the dual images remain, thereby enabling an accurate measurement of the image displacement.

The window generator 54, shown in FIG. 3, is an operator controlled device for selecting a window 64 on the display of monitor B, as is shown in FIG. 5. This window 64 precludes all but two prominent vertical edges 66, 68 for the timing measurement. The window information is coupled to the J-K flip-flop 78 for the generation of a reset signal. The reset pulse from the window generator enables the J-K flip-flop 78 only for scans across monitor B that fall within the area of window 64. Upon receipt of the first input image edge 66 from amplifier 76, a Schmidt trigger, the J-K flip-flop 78 changes state and activates the timing counter 88, via the terminal Q 80 from flip-flop 78 and enable terminal 84 of counter 88. The counter then accumulates counts from clock oscillator 86. Upon receipt of the second image edge 68 from amplifier 76, the J-K flip-flop 78 is reset and the counter 88 is disabled. The accumulated count is transferred to a memory and time-to-range translator 90, that is enabled by the Q terminal 82 of J-K flip-flop 78. Translator 90 in turn, drives the range display 92 and the auxiliary display 93. The value of the range is fed into monitor A for display via mixer 72.

Figure 6:
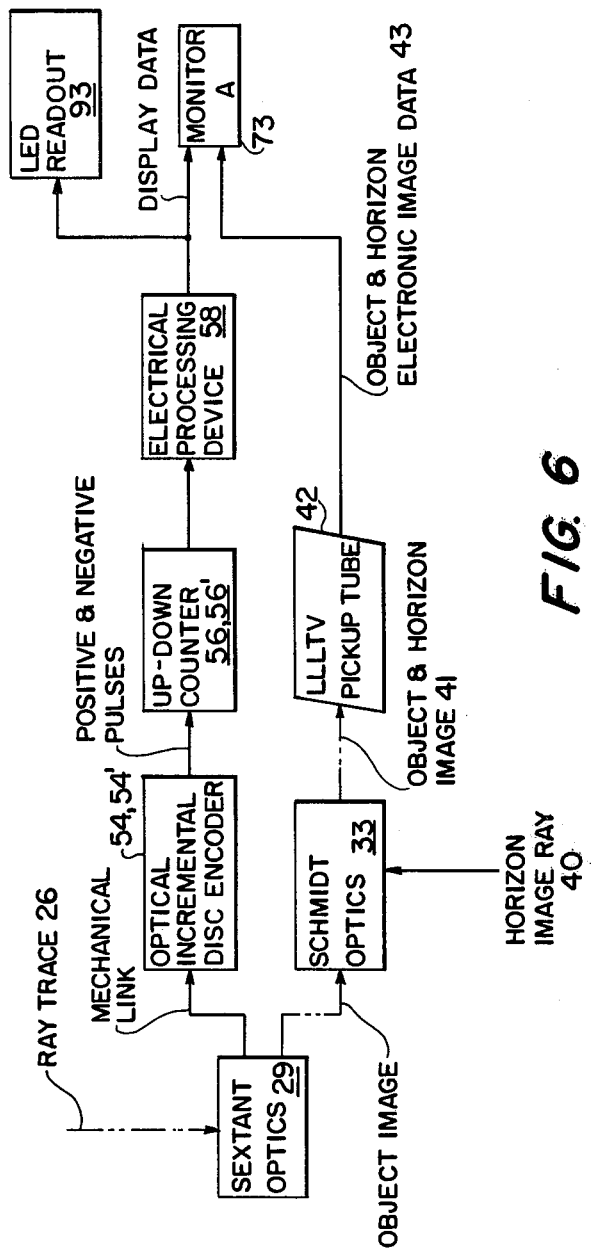
FIG. 6 is a single line flow diagram showing the functions of the embodiment of FIG. 1 when operated in either an altitude or bearing measuring mode.

Turn now to FIG. 6 where a single line flow diagram shows the operation of the device of FIG. 1 when used in either an altitude (i.e., as a sextant) or a bearing measuring mode. As is described in our U.S. Pat. No. 3,985,446, the image of a star or other elevated body (e.g., an airplane) is directed into the concave spherical reflector 32 of the Schmidt optics 33 by the sextant optics 29. The celestial image which is transmitted to the spherical reflector 32 is combined with the image of the horizon 40 transmitted into the Schmidt optics 33, for simultaneous display. The combined images 41 are thereafter transmitted to the LLLTV pickup camera 42, which has been specifically designed for sensitivity in illumination as low as overcast starlight, about $10^{-7}$ foot candles. Operation of a LLLTV pickup camera tube is more fully disclosed in the Journal of The Institute of Navigation, Vol. 20, No. 2, Summer 1973, pp. 116 to 120. The LLLTV camera 42 produces electronic signals 43 representative of the star and horizon image 41 for display on a cathode ray tube such as monitor A.

In order to direct the image of the celestial body to the concave spherical reflector 32 of the Schmidt optics 33, the sextant optics, collectively identified by numeral 29, must be properly aligned. The bi-directional optical incremental disc encoder 54 operates during alignment to produce positive and negative pulses representative of the forward and reverse changes, respectively, in the alignment of the sextant index mirror 28. These positive and negative pulses are accumulated in an up-down counter 56 so that the accumulated count is representative of the actual position of the index mirror 28. This accumulated count is processed in the electrical processing device 58 to indicate the angular position of the sextant index mirror 28 for digital display on either monitor A or on the auxiliary display 93.

Figure 7:
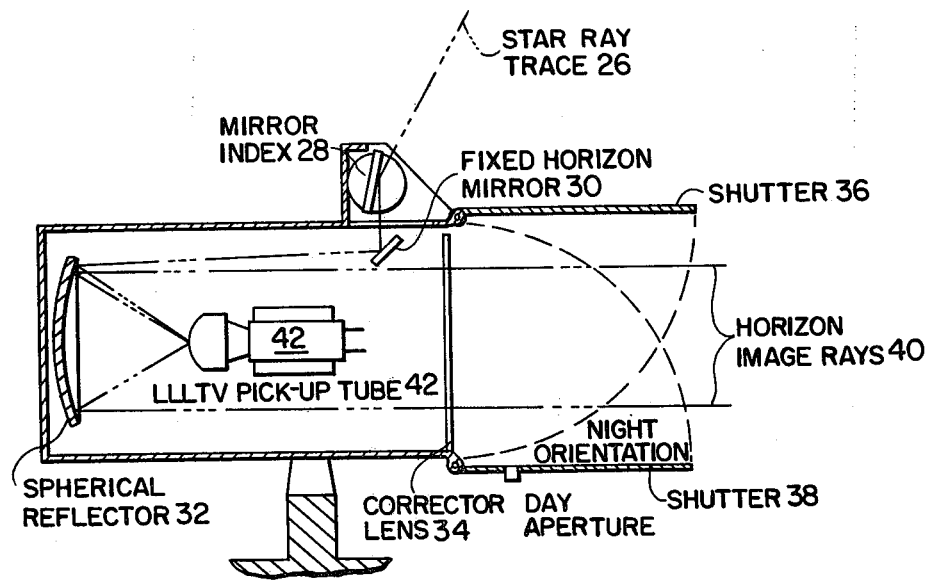
FIG. 7 is a partial sectional side view showing the embodiment of FIG. 1 operated in an altitude measuring mode.

The sextant optics 29, Schmidt optics 33, and camera 42 are more fully shown in FIG. 7. As shown there, the ray trace 26 of the celestial body is reflected by an adjustable index mirror 28 into a fixed horizon mirror 30 in the manner of standard marine sextant. The star ray trace 26 is thereafter transmitted to the concave spherical reflector 32 which, together with the corrector lens 34, and shutters 36 and 38 constitute the Schmidt optics 33 of FIG. 6. The horizon image rays 40 are combined

What is claimed, and desired to be secured by a United States Letters Patent, is:

1. A remotely controllable navigational instrument, comprised of:
   a concave spherical reflector exposable to objects lying along its principal axis, having a single focal point;
   a first and a second set of orthogonally arranged and remotely adjustable sextant optics, each including an index mirror disposed along a radial normal to the principal axis, and each reflecting onto the spherical reflector a primary image of one or more objects distant from the instrument;
   a first index mirror rotatable about a horizontal axis normal to the principal axis of the spherical reflector;
   the second index mirror rotatable about a third axis normal to the horizontal and the principal axes;
   the horizontal and third axes equidistant from the principal axis;
   first and second encoder means each mechanically linked to a different one of the sextant optics and each independently producing a position signal indicative of angular movement of the linked sextant optics;
   first and second circuit means each coupled to a different one of the encoder means and each providing an output indicative of the respective angular movement;
   an electronic camera located beyond the focal point for converting images upon the spherical reflector into a video signal for display;
   control means including means for eliminating all components of the video signal but those components representing pairs of parallel features of the primary images having a preferred orientation, means for displaying the pairs of parallel features by scanning a display surface, means for selecting from the display surface of field-of-view containing a pair of the parallel features, and means for producing a control signal varying in proportion to the spacing between the pair of parallel features; and,
   means controlled by the control signal for producing a signal representative of the spacing.

2. A remotely controllable navigational instrument, comprised of:
   a set of Schmidt optics coaxially spaced about a single focal point along the principal axis;
   a first index mirror remotely rotatable about a first axis;
   a second index mirror remotely rotatable about a second axis normal to the first axis;
   the first and the second axes intersecting different radials normal to the principal axis at points equidistant from the principal axis;
   reflective means for reflecting the first and second index mirrors into the reflective surface of the Schmidt optics;
   first and second encoder means each mechanically linked to a different one of the index mirrors and each independently producing a position signal indicative of angular movement of the linked index mirror;
   first and second circuit means each coupled to a different one of the encoder means and each providing an output indicative of the respective angular movement;
   an electronic camera located beyond the focal point, for converting images within the Schmidt optics into a video signal;
   control means including means for eliminating all components of the video signal but those components representing pairs of parallel features of the primary images having a preferred orientation, means for displaying the pairs of parallel features by scanning a display surface, means for selecting from the display surface a field-of-view containing a pair of the parallel features, and means for producing a control signal varying in proportion to the distance between the pair of parallel features; and,
   means controlled by the control signal for producing a signal representative of the distance.

3. The instrument set forth in claim 2 further comprised of the radials intersecting the principal axis at the same point.

4. The instrument set forth in claim 3 further comprised of the first axis being coaxial with one of the radials.

5. The instrument set forth in claim 3 further comprised of the first axis being coaxial with both of the radials.

6. The instrument set forth in claim 3 further comprised of the first axis being oblique with a plane normal to the principal axis.

7. The instrument set forth in claim 3 further comprised of the radials being orthogonal.

8. The instrument set forth in claim 3 further comprised of the first axis lying in a first plane normal to the second axis and the principal axis lying in a principal plane parallel to the first plane.

* * * * * with the star ray trace 26 by the spherical reflector 32 which focuses both of those rays onto the photosurface of LLLTV camera 42. When the device is not in use shutter 36 is placed into its closed position to completely block all incoming light in order to protect the LLLTV camera 42 from damaging radiation. Shutter 38 is used in its closed position for daytime operation. Shutter 36 is placed in its closed position when the device is used in a rangefinding mode in order to prevent horizon image rays 40 from reaching the spherical reflector 32.

Figure 8:
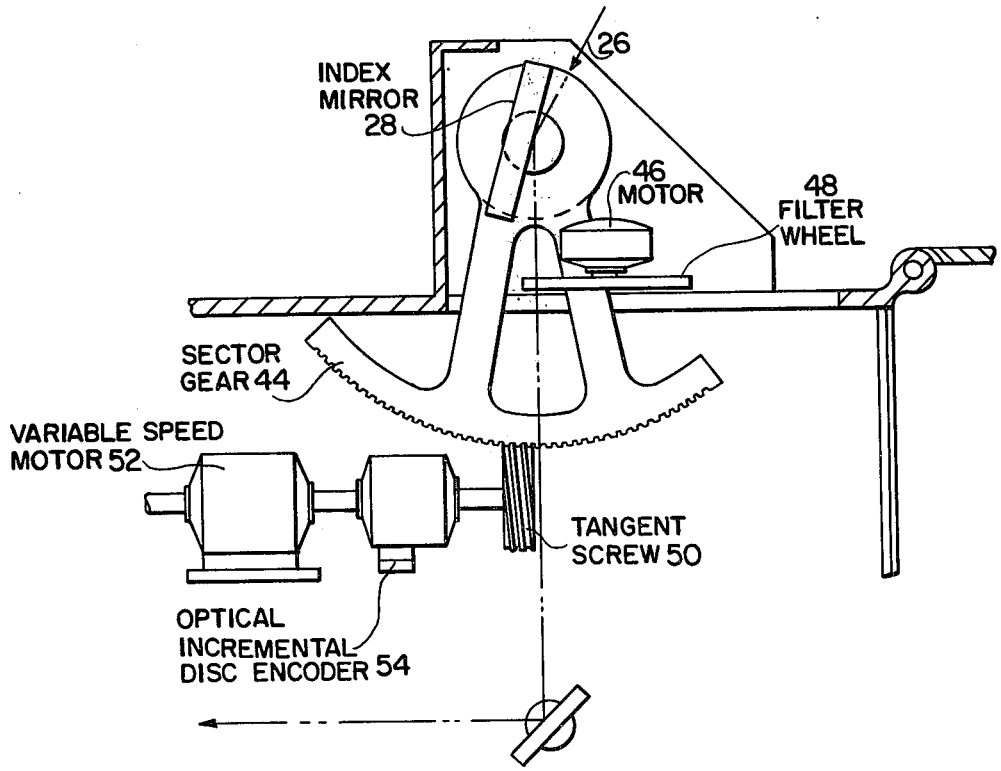
FIG. 8 is an expanded side view of the remote controlled sextant mechanism shown in FIG. 6.

FIG. 8 sets forth the detailed structure of the remote controlled sextant portion of the device shown in FIGS. 1 and 7. The index mirror 28 is attached to a sector gear 44 that controls the angular orientation of the index mirror 28. The angular orientation is, as in any standard marine sextant, proportional to the elevation of the celestial body when the ray trace 26 is aligned with the horizon ray 40 at the LLLTV pickup tube 42. A motor 46 and a filter wheel 48 are provided to filter the rays of brighter celestial bodies, such as those of the sun.

The sector gear 44 is remotely controlled by a tangent screw 50 driven by a variable speed, bi-directional motor 52. The motor 52 will turn the index mirror at a fast slewing speed (about ninety degrees per minute) to obtain a coarse altitude, and at a slow speed (about five degrees per minute) for the final coincidence of the sighted body with the horizon. The bi-directional optical incremental disc encoder 54 is mechanically connected by a common shaft to the bi-directional variable speed motor 52 in order to provide positive and negative pulses indicative of the direction of rotation of the tangent screw 50 and motor 52. Each rotation of the tangent screw 50 will rotate the line of sight by one degree. Each revolution of the encoder will provide 1,000 pulses or 0.001 degree per pulse (i.e., 3.6 seconds of arc per pulse). The encoder's 54 pulses are generated by the disc interruption of a light beam directed at a light sensor. In the bi-directional encoder 54, two separate output square wave pulses ninety degrees out of phase are generated to provide direction sensing. The encoder pulse pair is converted into a single clock pulse with a directional sensitive voltage. The directional sensitive voltage from pulses corresponding to increasing angles (i.e., clockwise motion of the encoder-tangent screw shaft) causes the counters to count upwards while the pulses corresponding to decreasing angles (i.e., counterclockwise motion of the shaft) causes a downward count. As discussed above, these pulses are accumulated in a conventional counter 56 (e.g., an RCA COS/MOS series CD 4029 up/down counter). This accumulated count is indicative of the position of the sector gear 44, the angle of the index mirror 28, and the elevation of the sighted body above the horizon. The binary signal from counter 56 activates a small, solid state multistage, light emitting diode array, which furnishes the navigator with a digital display. The solid state array includes its own MSI decoder/driver circuit. Each counter in the circuit counts from zero through nine before the next counter and lightemitting diode stage is activated. Five stages coupled in parallel will provide a digital display to 99.999°. The counter pulses are also sent to the logic circuit that controls the digital display on monitor A as well as to a computer programmed to perform sight reduction. Storage of the pulses will allow instanteous display of altitude when, upon coincidence of the sighted body and the horizon on monitor A, the navigator merely presses a display button.

Figure 9:
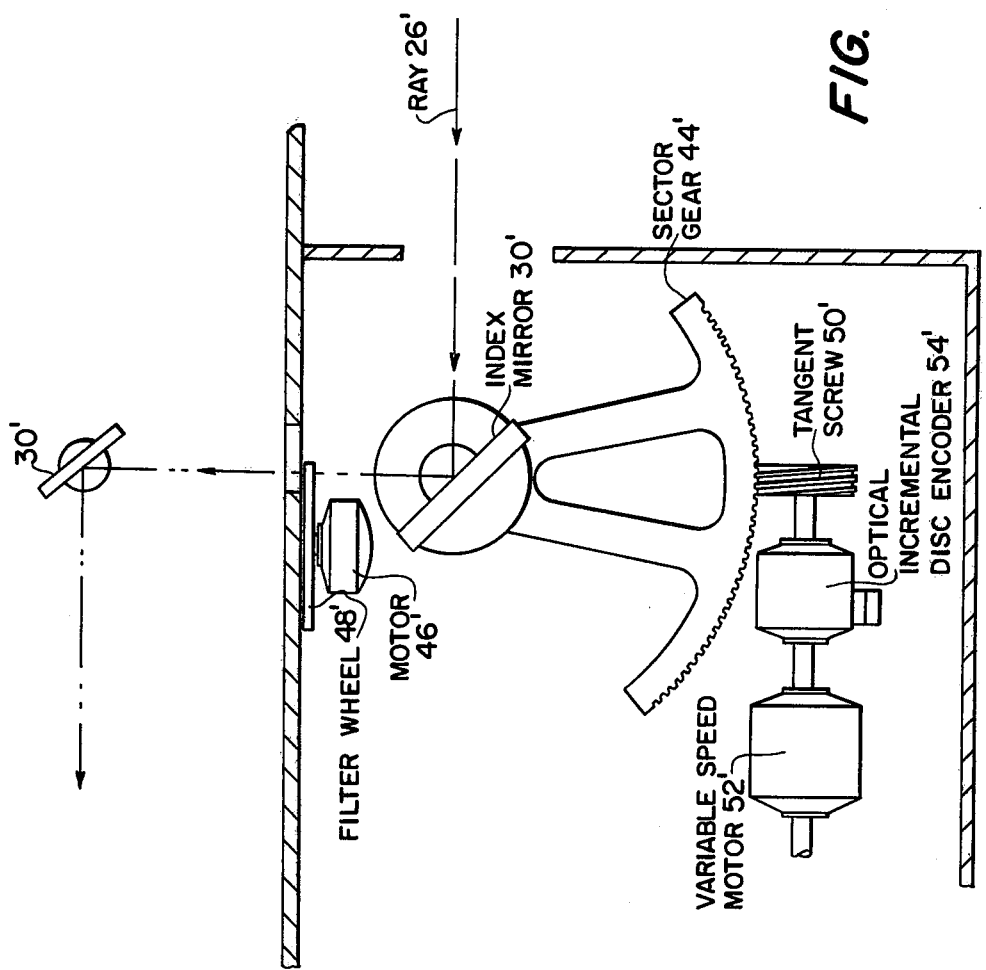
FIG. 9 is a partial sectional top view showing the embodiment of FIG. 1 operated in a bearing measuring mode.

FIG. 9 is a partial sectional view of the device used in a bearing measurement mode. The individual components shown in FIG. 9 are interchangeable with those represented by the identical, but unprimed, numerals in FIG. 8. While the index mirror 28 is rotated by sector gear 44 about a horizontal axis 20 normal to the principal axis of concave spherical reflector 32, index mirror 28', is rotated by sector gear 44' about a vertical axis 24 normal to the principal axis in order to reflect the ray 26' of an object off mirror 30', off spherical reflector 32 and onto the photosurface of the LLLTV camera 42. Turning index mirror 28' by means of sector gear 44', tangent screw 50', bi-directional incremental disc encoder 54', and bi-directional motor 52', will provide a signal to up-down counter 56' and ultimately to processing circuit 58 and monitor A that is indicative of the horizontal angle, $\phi$, between the principal axis and the object ray trace 26'. When the device is oriented so that the principal axis is parallel to the course of the vessel upon which the device is mounted, the angle $\phi$ is indicative of the relative bearing of the object. Alternately, if shutter 36 is opened and the principal axis of the device is directed to a first distant object, by rotating index mirror 28' about its axis 24 until coincidence of the first object and a second object is attained on monitor A, the device will provide a measurement of the angle having the device at its apex and the rays of the two objects as adjacent legs.

Figure 10:
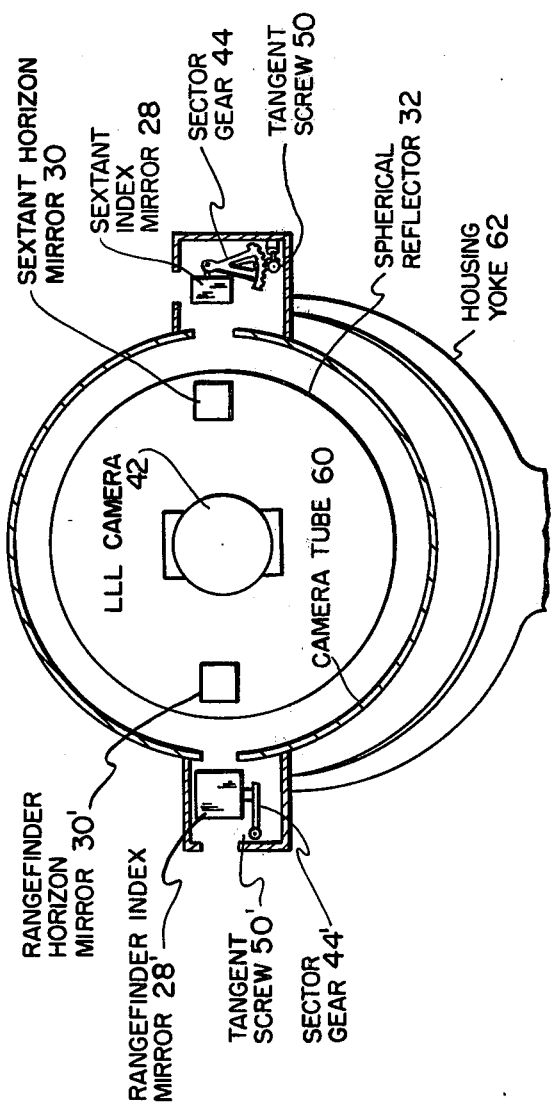
FIG. 10 is a front view of an alternate embodiment of the invention.

Obviously, many modifications and variations of the present invention are possible in light of the teachings of the foregoing paragraphs. For example, a third set of sextant optics may be disposed at the distance X from and symmetrically about, principal axis opposite sextant optics 29'. If LLLTV camera 42 was then arranged so that its longitudinal axis was coaxial with the principal axis of sphrical reflector 32, sextant optics 29', when used in conjunction with the third set of sextant optics, would provide the device with the capability to make range measurements independently from the operation of sextant optics 29. Additionally, FIG. 10 shows a front view of an alternate embodiment of the present invention. Sextant mirror 28 rotates about a horizontal axis 21 that is oblique to the principal axis and parallel to the surface of mirror 28. Index mirrors 28, 28' and horizon mirrors 30, 30' are symmetrically arranged in opposed pairs about the principal axis of the spherical reflector 32. The longitudinal axis of camera 42 is coaxial with the principal axis.

FIG. 11 shows a front view of still another embodiment of the present invention. As in FIG. 10, index mirrors 28, 28' and horizon mirrors 30, 30' are symmetrically arranged in pairs on opposite sides of the principal axis of spherical reflector 32. The axis 22 of index mirror 28 however, is orthogonal to both the axis 24 of index mirror 28' and to the principal axis. The longitudinal axis of camera 42 is coaxial with the principal axis. FIG. 12 shows still another alternate embodiment in which two sets of mirrors are symmetrically arranged above a vertical plane that includes the principal axis. The two sets allow the device to be operated simultaneously in the aximuth, bearing and range measurement modes.

The foregoing embodiments are merely illustrative of the basic principles of the invention. These principles apply to refractive as well as to reflective optics.